United States Patent
Mangalvedhe et al.

(10) Patent No.: US 11,943,753 B2
(45) Date of Patent: Mar. 26, 2024

(54) METHOD, APPARATUS AND COMPUTER PROGRAM

(71) Applicant: Nokia Technologies Oy, Espoo (FI)

(72) Inventors: Nitin Mangalvedhe, Hoffman Estates, IL (US); Rapeepat Ratasuk, Inverness, IL (US); Esa Tapani Tiirola, Kempele (FI); Srinivasan Selvaganapathy, Bangalore (IN); Jari Pekka Mustajärvi, Espoo (FI); Kari Pekka Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 539 days.

(21) Appl. No.: 17/265,804

(22) PCT Filed: Aug. 9, 2019

(86) PCT No.: PCT/EP2019/071442
§ 371 (c)(1),
(2) Date: Feb. 3, 2021

(87) PCT Pub. No.: WO2020/030789
PCT Pub. Date: Feb. 13, 2020

(65) Prior Publication Data
US 2021/0168806 A1    Jun. 3, 2021

(30) Foreign Application Priority Data
Aug. 9, 2018   (IN) .............................. 201811029989

(51) Int. Cl.
*H04W 72/04*   (2023.01)
*H04W 72/0453*  (2023.01)

(52) U.S. Cl.
CPC .............................. *H04W 72/0453* (2013.01)

(58) Field of Classification Search
CPC ... H04L 5/0041; H04L 5/0098; H04L 5/0051; H04L 5/0094; H04L 5/0039;
(Continued)

(56) References Cited

U.S. PATENT DOCUMENTS 10,356,752 B1 *  7/2019  Menon .............. H04W 52/0225
11,316,723 B2 *  4/2022  Kim ...................... H04W 72/23
(Continued)

FOREIGN PATENT DOCUMENTS

CN       106856670 A       6/2017
CN       107040338 A       8/2017
(Continued)

OTHER PUBLICATIONS

Rapeepat Ratasuk et al., Analysis of NB-IoT Deployment in LTE Guard-Band, Jun. 2017, 2017 IEEE Vehicular Technology Conference (VTC Spring). (Year: 2017).*
(Continued)

*Primary Examiner* — Rasheed Gidado
(74) *Attorney, Agent, or Firm* — Joseph C. Drish; Harrington & Smith (57) ABSTRACT

A method comprising configuring a narrowband internet of things carrier relative to one or more physical resource blocks of a radio carrier, the one or more physical resource blocks having a bandwidth that is greater than a bandwidth of the narrowband internet of things carrier; and configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

23 Claims, 7 Drawing Sheets

(58) Field of Classification Search
CPC ... H04L 5/0007; H04L 5/0037; H04L 5/0044; H04W 72/04; H04W 4/70
See application file for complete search history.

(56) References Cited

U.S. PATENT DOCUMENTS

| | | | | |
|---|---|---|---|---|
| 11,696,263 | B2* | 7/2023 | Hoglund | H04W 72/044 370/280 |
| 2014/0044085 | A1* | 2/2014 | Hong | H04L 5/0053 370/329 |
| 2017/0208592 | A1* | 7/2017 | Rico Alvarino | H04L 5/0048 |
| 2017/0230979 | A1 | 8/2017 | Saxena et al. | |
| 2017/0289965 | A1 | 10/2017 | You et al. | |
| 2018/0092080 | A1* | 3/2018 | Kim | H04L 5/0053 |
| 2018/0124726 | A1 | 5/2018 | Zhang et al. | |
| 2019/0334632 | A1* | 10/2019 | Ng | H04B 17/0085 |
| 2021/0105807 | A1* | 4/2021 | Li | H04W 72/20 |

FOREIGN PATENT DOCUMENTS

| | | |
|---|---|---|
| CN | 107197521 A | 9/2017 |
| CN | 107197524 A | 9/2017 |
| CN | 107809801 A | 3/2018 |
| CN | 108270529 A | 7/2018 |
| EP | 3160075 A1 * | 4/2017 |
| TW | 201728113 A | 8/2017 |
| WO | 2017/146342 A1 | 8/2017 |

OTHER PUBLICATIONS

International Search Report and Written Opinion received for corresponding Patent Cooperation Treaty Application No. PCT/EP2019/071442, dated Nov. 8, 2019, 11 pages.

Office Action received for corresponding Indian Patent Application No. 201811029989, dated Nov. 15, 2022, 6 pages.

Office Action received for corresponding European Patent Application No. 19755567.5, dated Oct. 4, 2022, 4 pages.

Office action received for corresponding Chinese Patent Application No. 201980066391.8, dated Sep. 7, 2023, 7 pages of office action and no page of translation available.

* cited by examiner

METHOD, APPARATUS AND COMPUTER PROGRAM

RELATED APPLICATION

This application was originally filed as PCT Application No. PCT/EP2019/071442, filed on Aug. 9, 2019, which claims priority from Indian Application No. 201811029989, filed on Aug. 9, 2018, each of which is incorporated herein by reference in its entirety.

FIELD

This disclosure relates to communications, and more particularly to carrier deployment in a wireless communication system. More particularly the present disclosure relates to a narrowband Internet of Things (NB-IoT) carrier.

BACKGROUND

The Internet of Things (IoT) is the interworking of physical devices, such as "smart devices" or "connected devices", via the Internet. NarrowBand-Internet of Things (NB-IoT) is a standards-based low power wide area (LPWA) technology developed to enable a wide range of new IoT devices and services. NB-IoT aims at improving the power consumption of user devices, system capacity and spectrum efficiency.

STATEMENT OF INVENTION

According to a first aspect, there is provided a method comprising: configuring a narrowband internet of things carrier relative to one or more physical resource blocks of a radio carrier, the one or more physical resource blocks having a bandwidth that is greater than a bandwidth of the narrowband internet of things carrier; and configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to an example, the method comprises allocating resources of a partial portion of the one or more physical resource blocks, the partial portion not occupied by the narrowband internet of things carrier.

According to an example, the method comprises allocating the resources of the partial portion of the one or more physical resource blocks to one or more user equipment.

According to an example, a size of the partial portion is pre-defined.

According to an example, a size of the partial portion is dynamically assigned.

According to an example, the method comprises configuring two or more narrowband internet of things carriers in the one or more physical resource blocks.

According to some examples the configuring a narrowband internet of things carrier relative to one or more physical resource blocks comprises ensuring that a central frequency of the narrowband internet of things carrier does not align with a central frequency of the physical resource block.

According to some examples, the one or more physical resource blocks of the radio carrier are blank prior to configuring of the narrowband internet of things carrier relative to the radio carrier.

According to an example the bandwidth of the physical resource block is greater than or equal to 180 kHz.

According to an example the bandwidth of the physical resource block is greater than or equal to 360 kHz.

According to an example the bandwidth of the physical resource block is greater than or equal to 720 kHz.

According to an example the bandwidth of the narrowband internet of things carrier is equal to or less than 180 kHz.

According to an example the first guard band is an equal size to the second guard band.

According to an example the first guard band is of a different size to the second guard band.

According to an example the one or more physical resource blocks of the radio carrier comprise a single physical resource block.

According to an example the radio carrier comprises a 5G radio carrier.

According to an example the one or more physical resource blocks of the radio carrier comprises two or more adjacent physical resource blocks.

According to an example, each of the first and second guard bands is equal to or larger than a specified minimum size.

According to an example, the partial portion of the one or more physical resource blocks comprises a residual portion of the physical resource block after the narrowband internet of things carrier and guard bands have been accommodated in the physical resource block.

According to an example, the method is carried out by a base station.

According to an example, the method comprises sending the configuration to a user equipment for deployment therein.

According to a second aspect there is provided a method comprising: using a narrowband internet of things carrier relative to one or more physical resource blocks of a radio carrier, the one or more physical resource blocks having a bandwidth that is greater than a bandwidth of the narrowband internet of things carrier; and using the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to an example, the method comprises using resources of a partial portion of the one or more physical resource blocks, the partial portion not occupied by the narrowband internet of things carrier.

According to an example, the method comprises using two or more narrowband internet of things carriers in the one or more physical resource blocks.

According to some examples the using a narrowband internet of things carrier relative to one or more physical resource blocks comprises ensuring that a central frequency of the narrowband internet of things carrier does not align with a central frequency of the physical resource block.

According to an example the one or more physical resource blocks of the radio carrier are blank prior to the using of the narrowband internet of things carrier relative to the radio carrier.

According to an example the bandwidth of the physical resource block is greater than or equal to 180 kHz.

According to an example the bandwidth of the physical resource block is greater than or equal to 360 kHz.

According to an example the bandwidth of the physical resource block is greater than or equal to 720 kHz.

According to an example the bandwidth of the narrowband internet of things carrier is equal to or less than 180 kHz.

According to an example, the first guard band is an equal size to the second guard band.

According to an example, the first guard band is of a different size to the second guard band.

According to an example, the one or more physical resource blocks of the radio carrier comprise a single physical resource block.

According to an example, the radio carrier comprises a 5G radio carrier.

According to an example the one or more physical resource blocks of the radio carrier comprise two or more adjacent physical resource blocks.

According to an example, each of the first and second guard bands is equal to or larger than a specified minimum size.

According to an example, the partial portion of the one or more physical resource blocks comprises a residual portion of the physical resource block after the narrowband internet of things carrier and guard bands have been accommodated in the physical resource block.

According to an example, the method is carried out by a user equipment.

According to an example, the using a narrowband internet of things carrier relative to one or more physical resource blocks of a radio carrier is carried out based on an instruction received from a base station.

According to a third aspect there is provided an apparatus comprising means for: configuring a narrowband internet of things carrier relative to one or more physical resource blocks of a radio carrier, the one or more physical resource blocks having a bandwidth that is greater than a bandwidth of the narrowband internet of things carrier; and configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to an example, the apparatus comprises means for: allocating resources of a partial portion of the one or more physical resource blocks, the partial portion not occupied by the narrowband internet of things carrier.

According to an example, the apparatus comprises means for: allocating the resources of the partial portion of the one or more physical resource blocks to one or more user equipment.

According to an example, a size of the partial portion is pre-defined.

According to an example, a size of the partial portion is dynamically assigned.

According to an example, the apparatus comprises means for: configuring two or more narrowband internet of things carriers in the one or more physical resource blocks.

According to some examples the configuring a narrowband internet of things carrier relative to one or more physical resource blocks comprises ensuring that a central frequency of the narrowband internet of things carrier does not align with a central frequency of the physical resource block.

According to some examples, the one or more physical resource blocks of the radio carrier are blank prior to configuring of the narrowband internet of things carrier relative to the radio carrier.

According to an example the bandwidth of the physical resource block is greater than or equal to 180 kHz.

According to an example the bandwidth of the physical resource block is greater than or equal to 360 kHz.

According to an example the bandwidth of the physical resource block is greater than or equal to 720 kHz.

According to an example the bandwidth of the narrowband internet of things carrier is equal to or less than 180 kHz.

According to an example the first guard band is an equal size to the second guard band.

According to an example the first guard band is of a different size to the second guard band.

According to an example the one or more physical resource blocks of the radio carrier comprise a single physical resource block.

According to an example the radio carrier comprises a 5G radio carrier.

According to an example the one or more physical resource blocks of the radio carrier comprises two or more adjacent physical resource blocks.

According to an example each of the first and second guard bands is equal to or larger than a specified minimum size.

According to an example the partial portion of the one or more physical resource blocks comprises a residual portion of the physical resource block after the narrowband internet of things carrier and guard bands have been accommodated in the physical resource block.

According to an example, the apparatus is a base station.

According to an example, the apparatus comprises means for: sending the configuration to a user equipment for deployment therein.

According to a fourth aspect there is provided an apparatus comprising means for: using a narrowband internet of things carrier relative to one or more physical resource blocks of a radio carrier, the one or more physical resource blocks having a bandwidth that is greater than a bandwidth of the narrowband internet of things carrier; and using the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to an example, the apparatus comprises means for: using resources of a partial portion of the one or more physical resource blocks, the partial portion not occupied by the narrowband internet of things carrier.

According to an example, the apparatus comprises means for: using two or more narrowband internet of things carriers in the one or more physical resource blocks.

According to some examples the using a narrowband internet of things carrier relative to one or more physical resource blocks comprises ensuring that a central frequency of the narrowband internet of things carrier does not align with a central frequency of the physical resource block.

According to an example the one or more physical resource blocks of the radio carrier are blank prior to the using of the narrowband internet of things carrier relative to the radio carrier.

According to an example the bandwidth of the physical resource block is greater than or equal to 180 kHz.

According to an example the bandwidth of the physical resource block is greater than or equal to 360 kHz.

According to an example the bandwidth of the physical resource block is greater than or equal to 720 kHz.

According to an example the bandwidth of the narrowband internet of things carrier is equal to or less than 180 kHz.

According to an example, the first guard band is an equal size to the second guard band.

According to an example, the first guard band is of a different size to the second guard band.

According to an example, the one or more physical resource blocks of the radio carrier comprise a single physical resource block.

According to an example, the radio carrier comprises a 5G radio carrier.

According to an example the one or more physical resource blocks of the radio carrier comprise two or more adjacent physical resource blocks.

According to an example each of the first and second guard bands is equal to or larger than a specified minimum size.

According to an example the partial portion of the one or more physical resource blocks comprises a residual portion of the physical resource block after the narrowband internet of things carrier and guard bands have been accommodated in the physical resource block.

According to an example, the apparatus is a user equipment.

According to an example, the using a narrowband internet of things carrier relative to one or more physical resource blocks of a radio carrier is carried out based on an instruction received from a base station.

According to a fifth aspect there is provided a computer program comprising instructions for causing an apparatus to perform at least the following: configuring a narrowband internet of things carrier relative to one or more physical resource blocks of a radio carrier, the one or more physical resource blocks having a bandwidth that is greater than a bandwidth of the narrowband internet of things carrier; and configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to a sixth aspect there is provided a computer program comprising instructions for causing an apparatus to perform at least the following: using a narrowband internet of things carrier relative to one or more physical resource blocks of a radio carrier, the one or more physical resource blocks having a bandwidth that is greater than a bandwidth of the narrowband internet of things carrier; and using the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to a seventh aspect, there is provided an apparatus comprising: at least one processor; at least one memory including computer program code; wherein the at least one memory and computer program code is configured to, with the at least one processor, cause the apparatus at least to perform: configuring a narrowband internet of things carrier relative to one or more physical resource blocks of a radio carrier, the one or more physical resource blocks having a bandwidth that is greater than a bandwidth of the narrowband internet of things carrier; and configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to an eighth aspect, there is provided an apparatus comprising: at least one processor; at least one memory including computer program code; wherein the at least one memory and computer program code is configured to, with the at least one processor, cause the apparatus at least to perform: using a narrowband internet of things carrier relative to one or more physical resource blocks of a radio carrier, the one or more physical resource blocks having a bandwidth that is greater than a bandwidth of the narrowband internet of things carrier; and using the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to a ninth aspect, there is provided a non-transitory computer readable medium comprising program instructions for causing an apparatus to perform at least following: configuring a narrowband internet of things carrier relative to one or more physical resource blocks of a radio carrier, the one or more physical resource blocks having a bandwidth that is greater than a bandwidth of the narrowband internet of things carrier; and configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

According to a tenth aspect, there is provided a non-transitory computer readable medium comprising program instructions for causing an apparatus to perform at least following: using a narrowband internet of things carrier relative to one or more physical resource blocks of a radio carrier, the one or more physical resource blocks having a bandwidth that is greater than a bandwidth of the narrowband internet of things carrier; and using the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

In an eleventh aspect there is provided a computer program comprising instructions stored thereon for performing at least the following: configuring a narrowband internet of things carrier relative to one or more physical resource blocks of a radio carrier, the one or more physical resource blocks having a bandwidth that is greater than a bandwidth of the narrowband internet of things carrier; and configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

In a twelfth aspect there is provided a computer program comprising instructions stored thereon for performing at least the following: using a narrowband internet of things carrier relative to one or more physical resource blocks of a radio carrier, the one or more physical resource blocks having a bandwidth that is greater than a bandwidth of the narrowband internet of things carrier; and using the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

In a thirteenth aspect there is provided a non-transitory computer readable medium comprising program instructions thereon for performing at least the following: configuring a narrowband internet of things carrier relative to one or more physical resource blocks of a radio carrier, the one or more physical resource blocks having a bandwidth that is greater than a bandwidth of the narrowband internet of things carrier; and configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

In a fourteenth aspect there is provided a non-transitory computer readable medium comprising program instructions thereon for performing at least the following: using a narrowband internet of things carrier relative to one or more physical resource blocks of a radio carrier, the one or more physical resource blocks having a bandwidth that is greater than a bandwidth of the narrowband internet of things carrier; and using the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

In a fifteenth aspect there is provided a method comprising: configuring a narrowband internet of things carrier relative to one or more physical resource blocks of a 5G radio carrier, the one or more physical resource blocks having a bandwidth that is greater than a bandwidth of the narrowband internet of things carrier.

The above example may be combined with any of the other described examples.

In a sixteenth aspect there is provided a method comprising: using a narrowband internet of things carrier relative to one or more physical resource blocks of a 5G radio carrier, the one or more physical resource blocks having a bandwidth that is greater than a bandwidth of the narrowband internet of things carrier.

The sixteenth aspect may be combined with any of the other described examples.

In the above, various aspects have been described. It should be appreciated that further aspects may be provided by the combination of any two or more of the aspects described above.

Various other aspects and further embodiments are also described in the following detailed description and in the attached claims.

BRIEF DESCRIPTION OF FIGURES

The invention will now be described in further detail, by way of example only, with reference to the following examples and accompanying drawings, in which.

DETAILED DESCRIPTION

Figure 1A:
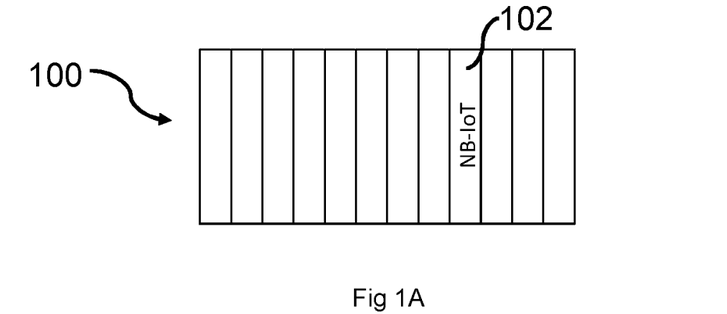
FIGS. 1A to 1C schematically show options for NB-IoT deployment in a radio carrier according to examples.
Figure 1B:
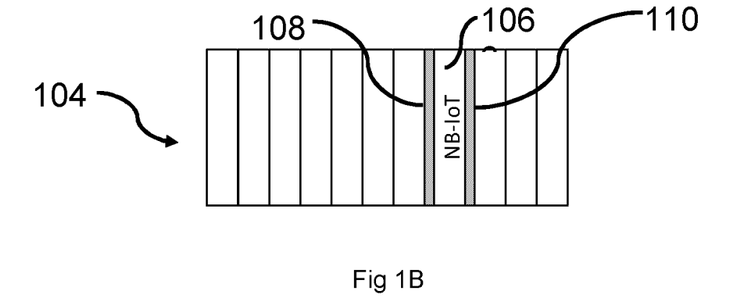
Figure 1C:
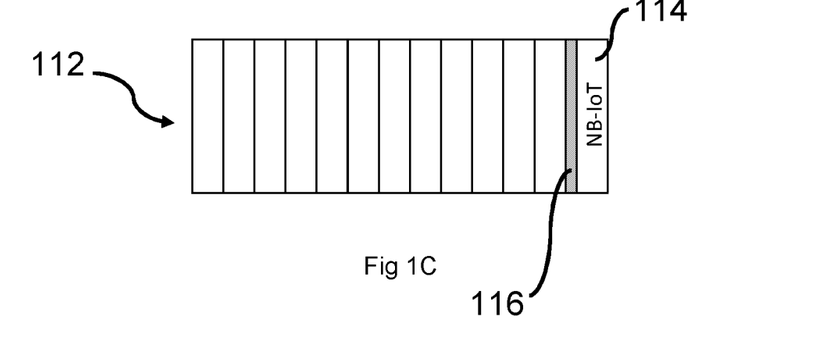

FIGS. 1A to 1C consider three different modes of deployment for NB-IoT technology: in-band, guard-band, and standalone, according to examples.

FIG. 1A schematically shows an example of in-band deployment. A frequency band is schematically shown at 100. The NB-IoT carrier frequencies are schematically represented "in-band" at 102. The "in-band" deployment efficiently utilises spectrum resources. However, the in-band deployment may introduce interference. It has been considered that in-band deployment may be used in an LTE context as no guard band is required between LTE and NB-IoT carriers and no interference is expected. In-band operation may require sharing of some of the NB-IoT resource blocks with LTE rendering them unavailable to NB-IoT at specific times.

FIG. 1B schematically shows a stand-alone deployment. A frequency band is schematically shown at 104. The NB-IoT carrier frequencies are schematically represented at 106, protected on either side by guard-intervals 108 and 110. It has been considered that stand-alone deployment may be used in a GSM context leaving guard interval of 10 kHz on both sides of the NB-IoT carrier.

FIG. 1C schematically shows a guard band deployment. A frequency band is schematically shown at 112. The NB-IoT carrier frequencies are schematically represented at 114, utilizing the unused resource blocks in the radio carrier or overlay radio carrier's 112 guard-band. It has been considered that guard-band deployment may be used in an LTE context.

When deployed, NR (5G) may use either frequency spectrum taken from LTE (i.e. refarming of LTE spectrum), or new NR spectrum may be used. For greenfield (i.e. new) NB-IoT deployments, it may be possible to use the stand-alone mode shown in FIG. 1B. In other deployment scenarios, particularly where NB-IoT is already deployed, in-band deployment of NB-IoT within an NR carrier may be the best approach.

Table 1 below shows some NR numerology options based on a subcarrier spacing of $15*2^N$ kHz.

TABLE 1

| Subcarrier spacing (kHz) | 15 | 30 | 60 | 120 | 240 |
|---|---|---|---|---|---|
| Symbol duration (us) | 66.7 | 33.3 | 16.7 | 8.33 | 4.17 |
| Nominal Normal CP (us) | 4.7 | 2.3 | 1.2 | 0.59 | 0.29 |
| Min scheduling interval (symbols) | 14 | 14 | 14 | 14 | 28 |

TABLE 1-continued

| Subcarrier spacing (kHz) | 15 | 30 | 60 | 120 | 240 |
|---|---|---|---|---|---|
| Min scheduling interval (slots) | 1 | 1 | 1 | 1 | 2 |
| Min scheduling interval (ms) | 1 | 0.5 | 0.25 | 0.125 | 0.125 |

15 kHz subcarrier spacing (SCS) is similar to LTE. This spacing may be considered good for a wide area on traditional cellular bands.

30 kHz subcarrier spacing may be more suitable for urban and dense urban environments, as it provides e.g. lower latency and wider carrier bandwidth with given FFT size.

60 kHz subcarrier spacing (or higher) may be needed e.g. for greater than 10 GHz bands, to combat phase noise. 60 kHz SCS is supported also for bands below 10 GHz. Typically, LTE supports NB-IoT with the following design options:
  Only Frequency Division Duplex (FDD) mode with normal cyclic prefix (CP) length
  180 kHz UE RF bandwidth for both downlink (DL) and uplink (UL)
  DL utilises Orthogonal Frequency-Division Multiple Access (OFDMA) with 15 kHz subcarrier spacing: 12 subcarriers are available in one NB-IoT carrier
  UL utilizes single-carrier frequency division multiple access (SC-FDMA) and supports:
    Single tone transmission with 3.75 kHz SCS
    Single tone transmission with 15 kHZ SCS
    Multi-tone (3, 6, 12) tone transmission with 15 kHz SCS.

The legacy NB-IoT physical layer is based on LTE numerology, and is inherently designed for the in-band mode without any issues for coexistence with the LTE carrier in which it is deployed, other than matching NB-IoT channel raster with selected LTE channel. The channel raster may be considered a list of carrier centre frequencies that a communication device scans to find a carrier. For both NB-IoT and LTE, the carrier centre frequency is an integer multiple of 100 kHz. In some examples the centre frequency of the NB-IoT carrier can deviate slightly from the raster. For example, when considering available NB-IoT carrier locations corresponding to the centres of the PRBs (physical resource blocks) within the LTE channel, they may not exactly match with NB-IoT channel raster (LTE PRBs do not have centre frequency of 100 kHz multiple, only the LTE carrier has). NB-10T carrier may be off the 100 kHz raster by 2.5 or 7.5 kHz depending on LTE carrier bandwidth. This may be deemed acceptable. When the NB-IoT carrier is deployed in-band within a bandwidth part (BWP) of an NR carrier, however, there are potential issues when the numerology of the BWP does not match that of LTE. In particular, the size of the NR PRB may be larger than that of LTE when the sub-carrier spacing (SCS) is larger (the SCS can be as high as 60 kHz in sub-6-GHz deployments). A large SCS corresponds to a larger PRB in frequency, a shorter slot length and wider channel bandwidth (with given FFT size), therefore, the NB-IoT carrier occupies a bandwidth that is smaller than the NR PRB. Here the placement of the NB-IoT carrier or the NR carrier needs to be specified considering the channel rasters. Furthermore, considering the mismatched FFT (fast fourier transform) grids between the NB-IoT carrier and the NR carrier, matching channel rasters may not alone be enough as improper placement of the NB-IoT carrier may create mutual interference. On the other hand, a large guard-band between the NB-IoT carrier and the adjacent NR PRB would lead to wastage of spectrum.

In legacy systems, LTE and NB-IoT channel raster is 100 kHz. The NB-IoT carrier is aligned with LTE PRB. As a result there is a frequency offset from the LTE channel raster to the centre frequency of the NB-IoT carrier. The anchor carrier can only be deployed in the PRB locations shown in the Table 2 below (from 0 to #PRBs−1).

TABLE 2

| | LTE system bandwidth | | | | |
|---|---|---|---|---|---|
| | 3 MHz | 5 MHz | 10 MHz | 15 MHz | 20 MHz |
| PRB indices for NPSS (NB-IoT Primary Synchronization Signal)/NSSS (NB-IoT Secondary Synchronization signal) transmission | 2, 12 | 2, 7, 17, 22 | 4, 9, 14, 19, 30, 35, 40, 45 | 2, 7, 12, 17, 22, 27, 32, 42, 47, 52, 57, 62, 67, 72 | 4, 9, 14, 19, 24, 29, 34, 39, 44, 55, 60, 65, 70, 75, 80, 85, 90, 95 |

The anchor carrier may be considered the carrier where synchronization channels (NPSS, NSSS) and broadcast channel NBPCH exist, and what the UE is scanning for. NB-IoT may also include non-anchor carriers for data transfer (multi-carrier support) in connected mode.

In legacy systems the frequency offset is typically ±2.5 kHz for 10 MHz/20 MHz (even number of PRBs), ±7.5 kHz for 3 MHz/5/MHz/15 MHz (odd number of PRBs). If more than one PRB is allocated in the in-band operation, only the anchor PRB needs to satisfy 100 kHz channel raster requirements.

Legacy systems do not disclose how an NB-IoT carrier may be deployed in-band within an NR carrier. The numerology, channel raster, and bandwidths of NR may differ from LTE. The NR channel raster depends on the RF channel frequency range. The NR channel raster range may be 5 kHz up to 3 GHz.

The prior art does not disclose static configuration of sub-PRB resources for uplink or downlink.

Figure 2:
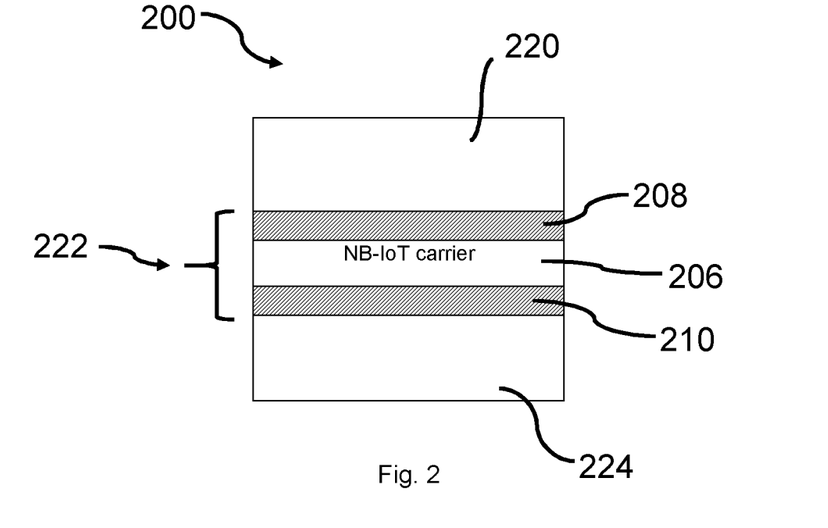
FIG. 2 schematically shows NB-IoT carrier deployment in a radio carrier according to an example.

FIG. 2 shows configuration of an NB-IoT carrier 206 according to an example. A frequency band or radio carrier is shown schematically at 200. The radio carrier 200 may be a 5G new radio (NR) carrier or a bandwidth part of the NR carrier. According to NR Rel-15, bandwidth part is a contiguous set of physical resource blocks, selected from a contiguous subset of the common resource blocks for a given numerology on a given carrier. For conciseness and ease of explanation three PRBs of carrier 200 are shown in FIG. 2, namely PRBs 220, 222 and 224. Of course, in typical examples the carrier 200 may comprise more PRBs. For example the carrier 200 or bandwidth part may comprise twelve PRBs. PRB 222 is located between PRB 220 and PRB 224. An NB-IoT carrier 206 is configured within the single PRB 222. That is, the NB-IoT carrier 206 is configured "in-band" in the radio carrier 200, in the example of FIG. 2. The NB-IoT carrier 206 is located between a first guard band 208 and a second guard band 210. The NB-IoT carrier 206 and the first and second guard bands 208 and 210 are configured so that together they fill PRB 222. In some examples the first guard band 208 is of equal size or near-equal size to second guard band 210. In some examples the first guard band (or guard interval) 208 is of a different size (e.g. larger or smaller) than the second guard band (or guard interval). Where the guard bands are of a different size to each other, there may be configured a maximum allowable difference between the guard band sizes. In some examples the maximum allowable difference is 20 kHz. In some examples there is a specified minimum size for the guard bands, such that the guard bands 208 and 210 are equal to are larger than the specified minimum size. In some examples the size of the guard bands 208 and 210 may be constrained by a sub-carrier spacing (SCS). In some examples the SCS may be 30 kHz. That is in some examples the minimum guard band size may be 30 kHz. In some examples the minimum guard band size may be dependent on the SCS of the bandwidth part (BWP) of the radio carrier. In some examples the minimum guard-band size may be specified in terms of a number of subcarriers (e.g. n subcarriers), rather than a bandwidth size (e.g. X kHz).

In examples the PRB 222 has a bandwidth that is greater than a bandwidth of NB-IoT carrier 206. In some examples the PRB 222 has a bandwidth that is equal to 180 kHz (e.g. when using 15 kHz SCS). In some examples the PRB 222 has a bandwidth that is equal to or greater than 360 kHz (e.g. when using 30 kHz SCS). In some examples the PRB 222 has a bandwidth that is equal to or greater than 720 kHz (e.g. when using 60 kHz or higher SCS). Therefore in some examples the NB-IoT carrier has available bandwidth equal to 180 kHz. In some examples the NB-IoT carrier has available bandwidth equal or less than 360 kHz. In some examples the NB-IoT carrier has a bandwidth equal or less than 720 kHz.

According to some examples the PRB 222 is blank or not used for NR UEs prior to, or during, deployment of the NB-IoT carrier 206 therein. Accordingly, in some examples the method comprises determining or selecting a blank PRB in a radio carrier for deployment or configuration in the blank PRB of an NB-IoT carrier.

According to some examples, there may be an allocation of a portion of bandwidth of a PRB containing the NB-IoT carrier 206. For example, it may be determined that there is sufficient bandwidth in the PRB 222 for NB-IoT carrier 206, the guard bands 208 and 210, and bandwidth for allocation to one or more entities or apparatus. For example any spare or residual bandwidth may be allocated to one or more user equipment.

It will be understood that in examples the NB-IoT carrier is configured relative to the radio carrier. In one example, the NR PRB grid is fixed, and the NB-IoT carrier is configured relative to the NR PRB grid. That is in an example, the NR (5G) carrier location and PRBs may be defined, and the NB-IoT carrier is configured relative to the fixed NR carrier location and PRBs. In another example the NB-IoT carrier is fixed, and the NR PRB grid is adjusted around the NR PRB grid. That is in an example the NB-IoT carrier already exists, and the NR carrier location and/or NR BWP are defined so as to optimize the location of the NB-IoT carrier (for example, inside a single PRB with adequate guards).

It will also be understood that although in some examples the NB-IoT carrier is shown as placed in a single PRB, in some examples the NB-IoT carrier may overlap two or more PRBs. In such examples the two or more PRBs together have a bandwidth greater than the NB-IoT carrier.

According to some examples the configuring the NB-IoT carrier in the PRB comprises a comparison determination. According to some examples the comparison comprises a comparison between a frequency characteristic of the NB-IoT carrier and a frequency characteristic of the radio carrier in which the NB-IoT carrier is to be configured or deployed. According to some examples the frequency characteristic of the NB-IoT anchor carrier comprises a channel raster of the NB-IoT carrier. According to some examples the frequency characteristic of the radio carrier comprises a channel raster of the radio carrier. As discussed above the channel raster may comprise one or more steps or frequencies that are available. According to some examples the NB-IoT carrier, and the radio carrier in which the NB-IoT carrier is deployed are within a specified frequency offset relative to each other. More particularly, in some examples the NB-IoT carrier, and the PRB in which the NB-IoT carrier is deployed are within a specified offset relative to each other. According to some examples the NB-IoT carrier location is within a maximum offset relative to the NB-IoT channel raster. According to an example the maximum offset comprises 7.5 kHz. In some examples, the frequency offset of the NB-IoT carrier is dependent on the SCS and/or PRB of the NR in which the NB-IoT carrier is deployed.

According to some examples the NB-IoT carrier can be deployed in different operation modes within the NR carrier depending on the frequency characteristic of the NB-IoT carrier and the frequency characteristic of the NR carrier. For example, NB-IoT can be deployed using a different frequency offset in guard-band or in-band operation mode compared to in stand-alone operation mode. Therefore, NB-IoT carrier may be deployed in guard-band operation mode within the NR carrier if the frequency offset is more suitable based on placement of NB-IoT carrier within the NR PRB.

According to some examples the frequency characteristic of the NB-IoT carrier comprises a central frequency or carrier frequency of the narrowband internet of things carrier, and the frequency characteristic of the radio carrier comprises a central frequency or carrier frequency of the radio carrier.

According to some examples the narrowband internet of things carrier is deployed in the radio carrier in a manner such that a central frequency of the NB-IoT carrier does not align with a PRB of the radio carrier.

Figure 3:
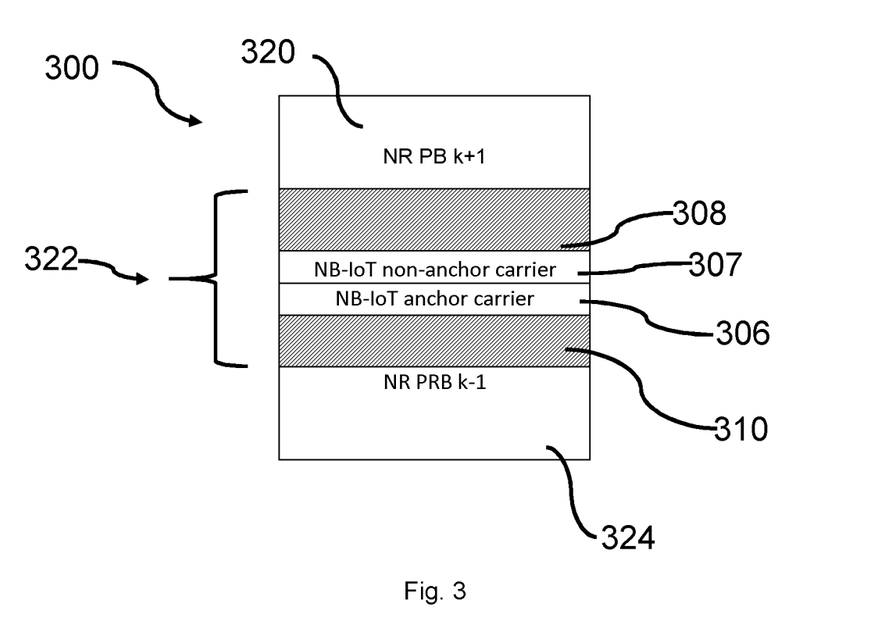
FIG. 3 schematically shows NB-IoT carrier deployment in a radio carrier according to an example.

According to some examples, two or more NB-IoT carriers may be deployed within a same PRB (for example anchor carrier and one or more non-anchor carriers). According to some examples the two or more NB-IoT carriers are deployed adjacent each other within the same PRB. This is schematically shown in FIG. 3 which shows an NB-IoT anchor carrier 306 adjacent to an NB-IoT non-anchor carrier 307, within PRB 322. Guard bands are shown at 308 and 310. Adjacent PRBs are shown at 320 and 324. In some examples the radio carrier 300 may be adjusted on the raster so that an already deployed NB-IoT anchor carrier 306 is located as required within the PRB 322 that is reserved for NB-IoT. In other examples, the location or width of the BWP of the radio carrier 300 containing the PRB 322 is adjusted so that an already deployed NB-IoT anchor carrier 306 is located as required within the PRB 322.

As discussed above, the NR PRB can be quite large (such as 720 kHz when using 60 kHz SCS or 360 kHz when using 30 kHz SCS), and the NB-IoT carrier (e.g. 180 kHz) may cover only a portion of the NR PRB. In order to improve spectrum, in some examples the NR resource allocation may optimize the current coexistence scenario. According to some examples this is achieved by means of partial PRB allocation.

According to an example, an apparatus such as a base station (e.g. gNB) may configure a partial PRB for allocation to NR UEs within the PRB reserved for NB-IoT deployment on the uplink and/or downlink. That is the base station may allocate a partial portion of a PRB to one or more user equipment. According to some examples, the partial portion of the physical resource block comprises a residual portion of the physical resource block after the narrowband internet of things carrier and guard bands have been accommodated in the physical resource block. A size of the partial or residual PRB resource may be determined such that the minimum guard band size with the NB-IoT carrier is provided.

According to some examples the supported partial PRB sizes are predefined. For example a partial PRB size may be e.g. ¼ PRB (3 subcarriers); ⅓ PRB (4 subcarriers), and/or ½ PRB (6 subcarriers); or dynamically assigned (N subcarriers).

According to an example the NR PRB index with a partial resource may be indicated through higher layer signaling. In some examples, where the sub-carriers allotted for NB-IoT are indicated to the UE as invalid via higher layer signalling, then they shall remain invalid independent of the DCI instructions. Information of a size of the partial PRB and its location within the PRB may be comprised in the indication.

According to some examples a new DCI (Downlink Control Information) format is not defined for allocation of partial PRB resources. In such examples when DCI assigns a UE resources in a PRB configured as a partial PRB, the resource allocation is understood to correspond to the configured part. In some examples a DCI is defined to indicate what is assigned.

According to some examples, from a NR (5G) point of view, the guard band portion of the PRB can be seen as a reserved resource. According to some examples the UE may perform rate matching around reserved subcarriers.

Therefore, according to some examples a UE is assigned only a partial PRB.

According to some examples a UE may be assigned a partial PRB together with other or full PRBs.

According to some examples a transport block size (TBS) includes support for a partial PRB allocation According to some examples a base station (e.g. gNB) may indicate dynamically, whether to use a certain PRB as partial PRB or full (normal) PRB.

Figure 4:
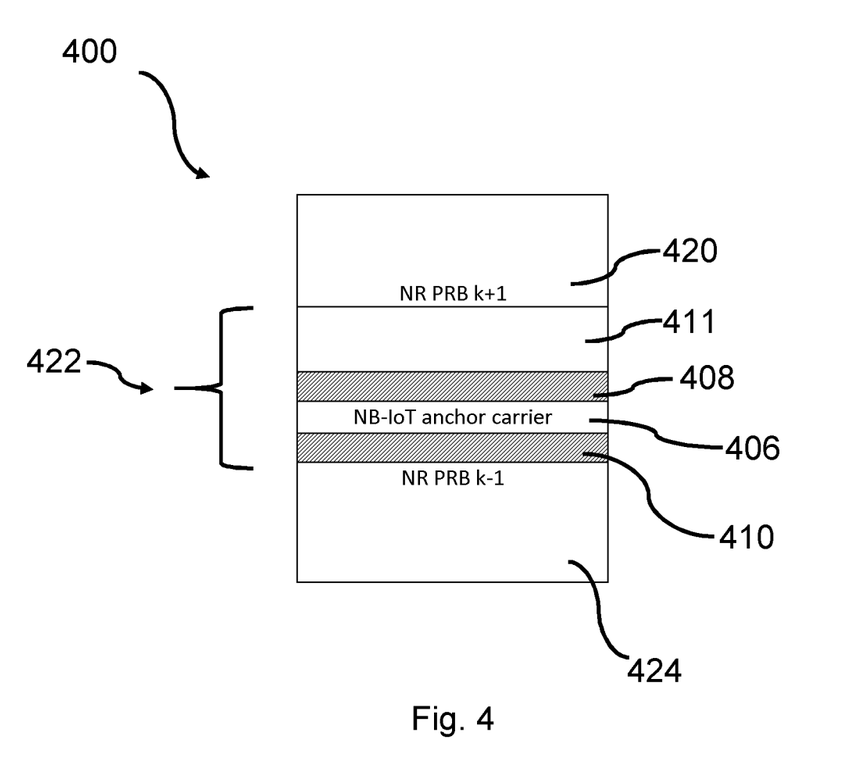
FIG. 4 schematically shows NB-IoT carrier deployment in a radio carrier according to an example.

Some of these concepts are explained with respect to FIG. 4 which schematically shows a radio carrier 400 comprising PRBs 420, 422 and 424 (more PRBs may be provided in examples). PRB 422 comprises NB-IoT carrier 406, with guard bands 408 and 410. NB-IoT carrier 406, plus guard bands 408 and 410 do not fill PRB 422. Accordingly, to improve spectrum utilization, a partial portion 411 of PRB 422 may be allocated to one or more UEs.

Figure 5:
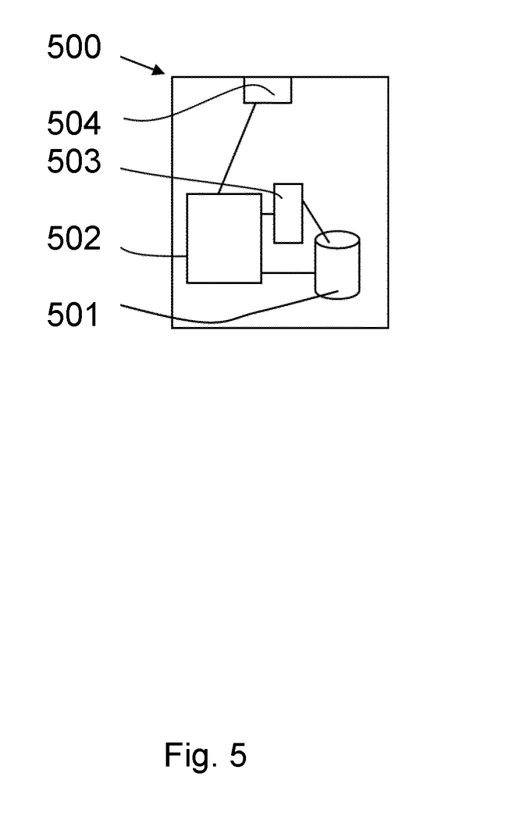
FIG. 5 schematically shows a control apparatus according to an example.

According to some examples, the method of configuring of the NB-IoT carrier relative to a radio carrier is carried out by a control apparatus of a network. FIG. 5 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. In some examples the gNB controls scheduling. Static configuration of the location of NB-IoT may be received via O&M. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 500 can be arranged to provide control on communications in the service area of the system. The control apparatus 500 comprises at least one memory 501, at least one data processing unit 502, 503 and an input/output interface 504. Via the interface the control apparatus can be coupled to a receiver and a transmitter of a base station. The receiver and/or the transmitter may be implemented as a radio front end or a remote radio head. For example the control apparatus 500 or processor 501 can be configured to execute an appropriate software code to provide the control functions.

The control apparatus 500 may communicate with one or more wireless communication devices. A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

Figure 6:
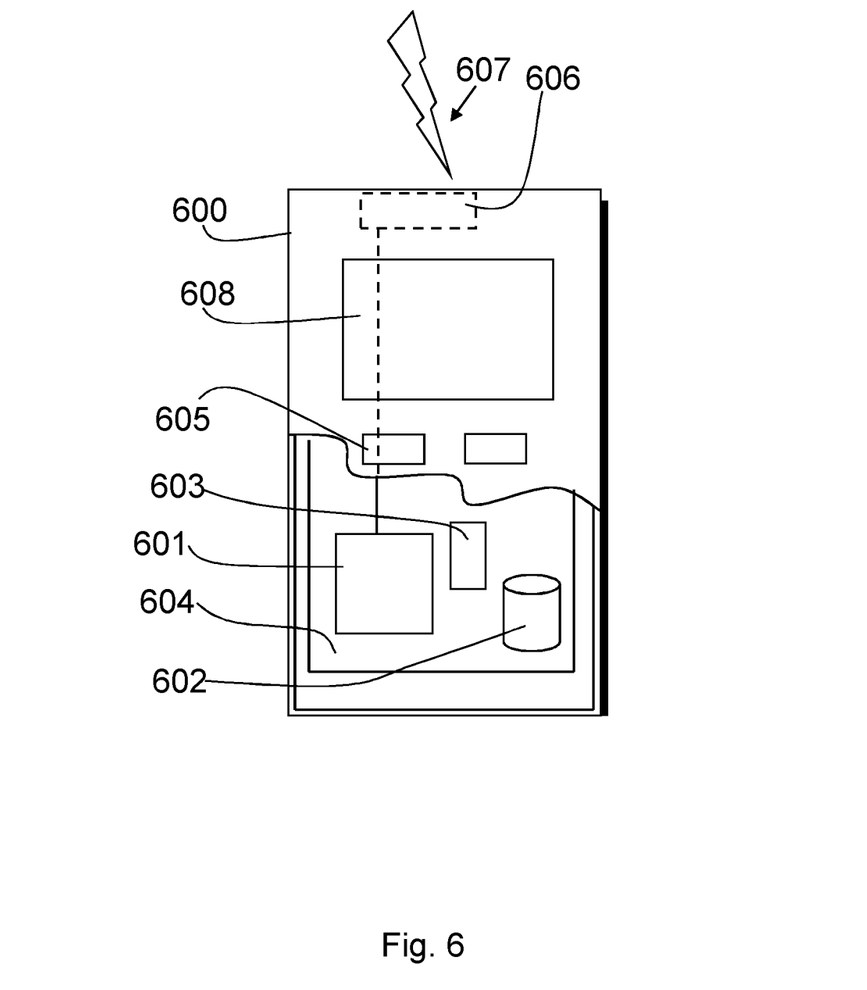
FIG. 6 schematically shows a wireless device according to an example.

FIG. 6 schematically shows an example of a wireless device 600, such as a user equipment (UE). A UE may be configured to use the NB-IoT carrier relative to the radio carrier. For example, the UE may be configured to use the NB-IoT carrier relative to the radio carrier in response to a configuration provided by a base station. The wireless device 600 may receive signals over an air or radio interface 607 via appropriate apparatus for receiving and may transmit signals via appropriate apparatus for transmitting radio signals. In FIG. 6 transceiver apparatus is designated schematically by block 606. The transceiver apparatus 606 may be provided for example by means of a radio part and associated antenna arrangement. The antenna arrangement may be arranged internally or externally to the wireless device. A wireless device is typically provided with at least one data processing entity 601, at least one memory 602 and other possible components 603 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 604. The user may control the operation of the wireless device by means of a suitable user interface such as key pad 605, voice commands, touch sensitive screen or pad, combinations thereof or the like. A display 608, a speaker and a microphone can be also provided. Furthermore, a wireless communication device may comprise appropriate connectors (either wired or wireless) to other devices and/or for connecting external accessories, for example hands-free equipment, thereto.

Figure 7:
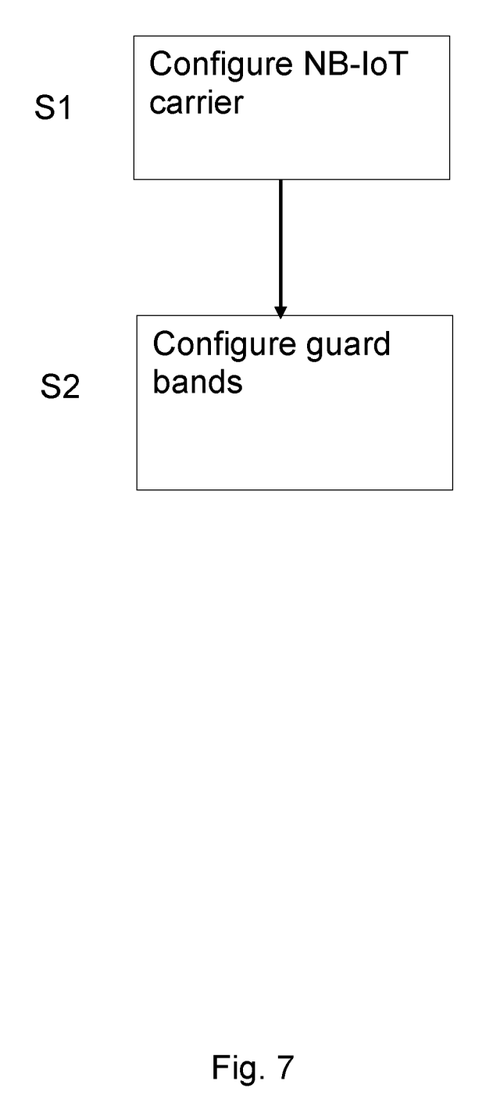
FIG. 7 is a flow chart schematically showing steps of a method according to an example.

FIG. 7 is a flow chart showing a method according to an example, viewed from the perspective of e.g. a base station.

Figure 8:
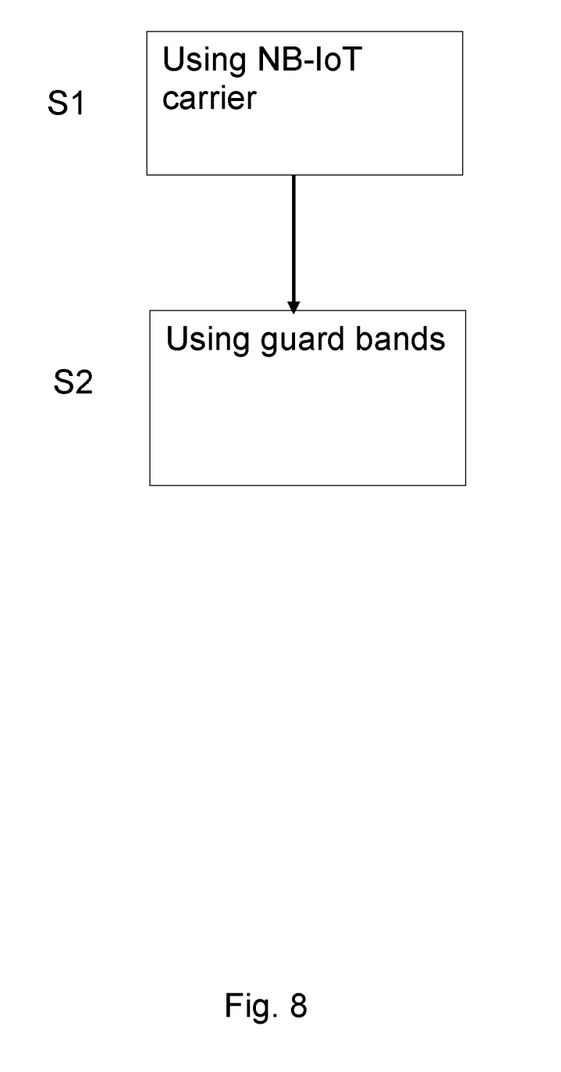
FIG. 8 is a flow chart schematically showing steps of a method according to an example.

At S1 the method comprises configuring an NB-IoT carrier. This may comprise configuring a narrowband internet of things carrier relative to one or more physical resource blocks of a radio carrier, the one or more physical resource blocks having a bandwidth that is greater than a bandwidth of the narrowband internet of things carrier. At S2, the method comprises configuring guard bands. This may comprise configuring the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block FIG. 8 is a flow chart showing a method according to an example, viewed from the perspective of e.g. a UE. The method of FIG. 8 may be carried out in response to receiving a configuration from a base station, for example.

At S1 the method comprises using an NB-IoT carrier. This may comprise using a narrowband internet of things carrier relative to one or more physical resource blocks of a radio carrier, the one or more physical resource blocks having a bandwidth that is greater than a bandwidth of the narrowband internet of things carrier.

At S2 the method comprises using guard bands. This may comprise using the narrowband internet of things carrier relative to the one or more physical resource blocks such that there is a first guard band between the narrowband internet of things carrier and a first adjacent physical resource block, and a second guard band between the narrowband internet of things carrier and a second adjacent physical resource block.

It will be understood that the described examples may enable in-band deployment of an NB-IoT carrier within a NR carrier for all supported NR SCSs while ensuring coexistence. The NB-IoT or NR carrier location can be tuned to ensure a minimum guard band as well as symmetric/asymmetric guard bands as desired. The described support of partial PRB usage reduces wastage of resources. Some examples relate to semi-static configuration of a partial PRB depending on available resources and dynamic allocation of the configured partial PRB to UEs.

From a base station implementation point of view (e.g. gNB), examples may provide smooth coexistence between NB-IoT and NR. This may be at least in part because NB-IoT (using potentially different numerology compared to NR) can be "localized" within predefined NR PRBs having self-contained guard bands between NB-IoT and NR.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus, comprising:
a processor; and
a non-transitory memory including instructions, the instructions, when executed by the processor, cause the apparatus to:
configure a narrowband internet of things carrier relative to one or more physical resource blocks of a radio carrier and within one physical resource block of the one or more physical resource blocks, the one or more physical resource blocks having a bandwidth that is greater than a bandwidth of the narrowband internet of things carrier; and
configure the narrowband internet of things carrier relative to the one or more physical resource blocks and within the one physical resource block of the one or more physical resource blocks such that there is a first guard band between the narrowband internet of things carrier and a first adjacent physical resource block, and a second guard band between the narrowband internet of things carrier and a second adjacent physical resource block.

2. The apparatus according to claim 1, wherein the instructions, when executed by the processor, further cause the apparatus to allocate resources of a partial portion of the one physical resource block within which the narrowband internet of things carrier is configured, the partial portion not occupied by the narrowband internet of things carrier.

3. The apparatus according to claim 2, wherein the instructions, when executed by the processor, further cause the apparatus to allocate the resources of the partial portion of the one physical resource block within which the narrowband internet of things carrier is configured to one or more user equipment.

4. The apparatus according to claim 2, wherein a size of the partial portion is pre-defined.

5. The apparatus according to claim 2, wherein a size of the partial portion is dynamically assigned.

6. The apparatus according to claim 1, wherein the instructions, when executed by the processor, further cause the apparatus to configure two or more narrowband internet of things carriers in the one or more physical resource blocks.

7. The apparatus according to claim 1, the one or more physical resource blocks of the radio carrier being blank, prior to configuring of the narrowband internet of things carrier relative to the radio carrier.

8. The apparatus according to claim 1, the first guard band being an equal size to the second guard band.

9. The apparatus according to claim 1, the first guard band being of a different size to the second guard band.

10. The apparatus according to claim 1, the one or more physical resource blocks of the radio carrier comprising a single physical resource block.

11. The apparatus according to claim 1, the radio carrier comprising a 5G radio carrier.

12. The apparatus of claim 1, wherein the first adjacent physical resource block is adjacent to the one physical resource block within which the narrowband internet of things carrier is configured.

13. The apparatus of claim 1, wherein the second adjacent physical resource block is adjacent to the one physical resource block within which the narrowband internet of things carrier is configured.

14. The apparatus of claim 1, wherein:
the first adjacent physical resource block is adjacent to the one physical resource block within which the narrowband internet of things carrier is configured; and
the second adjacent physical resource block is adjacent to the one physical resource block within which the narrowband internet of things carrier is configured.

15. An apparatus, comprising:
a processor; and
a non-transitory memory including instructions, the instructions, when executed by the processor, cause the apparatus to:
use a narrowband internet of things carrier relative to one or more physical resource blocks of a radio carrier, the narrowband internet of things carrier configured within one physical resource block of the one or more physical resource blocks, the one or more physical resource blocks having a bandwidth that is greater than a bandwidth of the narrowband internet of things carrier; and
use the narrowband internet of things carrier relative to the one or more physical resource blocks and within the one physical resource block of the one or more physical resource blocks such that there is a first guard band between the narrowband internet of things carrier and a first adjacent physical resource block, and a second guard band between the narrowband internet of things carrier and a second adjacent physical resource block.

16. The apparatus according to claim 15, comprising using resources of a partial portion of the one physical resource block within which the narrowband internet of things carrier is configured, the partial portion not occupied by the narrowband internet of things carrier.

17. The apparatus according to claim 15, comprising deploying two or more narrowband internet of things carriers in the one or more physical resource blocks.

18. The apparatus according to claim 15, the one or more physical resource blocks of the radio carrier being blank, prior to the deploying of the narrowband interne of things carrier relative to the radio carrier.

19. The apparatus according to claim 15, the first guard band being an equal size to the second guard band.

20. The apparatus according to claim 15, the first guard band being of a different size to the second guard band.

21. The apparatus according to claim 15, the one or more physical resource blocks of the radio carrier comprising a single physical resource block.

22. The apparatus according to claim 15, the radio carrier comprising a 5G radio carrier.

23. A method comprising:
configuring a narrowband internet of things carrier relative to one or more physical resource blocks of a radio carrier and within one physical resource block of the one or more physical resource blocks, the one or more physical resource blocks having a bandwidth that is greater than a bandwidth of the narrowband internet of things carrier; and
configuring the narrowband internet of things carrier relative to the one or more physical resource blocks and within the one physical resource block of the one or more physical resource blocks such that there is a first guard band between the narrowband internet of things carrier and a first adjacent physical resource block, and a second guard band between the narrowband internet of things carrier and a second adjacent physical resource block.

\* \* \* \* \*